United States Patent
Sai et al.

(10) Patent No.: US 9,087,455 B2
(45) Date of Patent: Jul. 21, 2015

(54) METHOD AND SYSTEM FOR PROVIDING MAP INTERACTIVITY FOR A VISUALLY-IMPAIRED USER

(75) Inventors: Jayant Sai, Sunnyvale, CA (US); Victor Tsaran, Sunnyvale, CA (US)

(73) Assignee: YAHOO! INC., Sunnyvale, CA (US)

( * ) Notice: Subject to any disclaimer, the term of this patent is extended or adjusted under 35 U.S.C. 154(b) by 141 days.

(21) Appl. No.: 13/207,417

(22) Filed: Aug. 11, 2011

(65) Prior Publication Data

US 2013/0042180 A1 Feb. 14, 2013

(51) Int. Cl.
| | |
|---|---|
| G06F 3/00 | (2006.01) |
| G09B 21/00 | (2006.01) |
| G06F 3/048 | (2013.01) |
| G09B 29/00 | (2006.01) |

(52) U.S. Cl.
CPC .............. *G09B 21/006* (2013.01); *G06F 3/048* (2013.01); *G09B 21/008* (2013.01); *G09B 29/007* (2013.01)

(58) Field of Classification Search
CPC .................... G06F 17/30241; G06F 17/30256; G06F 17/3087; G06F 3/048; H04W 4/023; H04W 4/04; G01C 21/32
USPC ........................................................ 715/729
See application file for complete search history.

(56) References Cited

U.S. PATENT DOCUMENTS

| | | | |
|---|---|---|---|
| 7,272,489 B2* | 9/2007 | Tu ................................... 701/438 |
| 7,437,279 B2* | 10/2008 | Agrawala et al. ................. 703/6 |
| 7,526,492 B2* | 4/2009 | Mikuriya et al. .............. 701/454 |
| 7,603,621 B2* | 10/2009 | Toyama et al. ................ 715/707 |
| 7,706,520 B1* | 4/2010 | Waterson et al. ......... 379/265.06 |
| 8,463,289 B2* | 6/2013 | Shklarski et al. ........... 455/456.1 |
| 8,707,195 B2* | 4/2014 | Fleizach et al. ............... 715/773 |
| 2003/0235276 A1* | 12/2003 | Tateishi et al. ............. 379/88.01 |
| 2005/0233287 A1* | 10/2005 | Bulatov et al. ................ 434/114 |
| 2006/0038690 A1* | 2/2006 | Shmerling et al. ............ 340/576 |
| 2006/0058947 A1* | 3/2006 | Schalk .......................... 701/207 |
| 2006/0156228 A1* | 7/2006 | Gallo et al. ................... 715/523 |
| 2006/0287862 A1* | 12/2006 | Levin et al. ................... 704/271 |
| 2007/0198308 A1* | 8/2007 | Crean et al. ....................... 705/5 |
| 2008/0228496 A1* | 9/2008 | Yu et al. ......................... 704/275 |
| 2009/0005981 A1* | 1/2009 | Forstall et al. ................ 701/211 |
| 2009/0210388 A1* | 8/2009 | Elson et al. ....................... 707/3 |
| 2009/0300528 A1* | 12/2009 | Stambaugh ................... 715/764 |
| 2010/0146394 A1* | 6/2010 | Morris ......................... 715/733 |
| 2010/0223577 A1* | 9/2010 | Bennett et al. ................ 715/800 |
| 2011/0059423 A1* | 3/2011 | Kadar et al. .................. 434/185 |
| 2011/0115822 A1* | 5/2011 | Bae .............................. 345/661 |
| 2011/0137437 A1* | 6/2011 | Jonsson .......................... 700/94 |
| 2011/0177845 A1* | 7/2011 | Fasold .......................... 455/566 |
| 2012/0159357 A1* | 6/2012 | Lim et al. ...................... 715/760 |
| 2012/0194547 A1* | 8/2012 | Johnson et al. ............... 345/632 |
| 2012/0317522 A1* | 12/2012 | Duarte et al. ................. 715/863 |

* cited by examiner

*Primary Examiner* — Kieu Vu
*Assistant Examiner* — Andrew Chung
(74) *Attorney, Agent, or Firm* — James J. DeCarlo; Greenberg Traurig, LLP

(57) ABSTRACT

Map interactivity for a visually-impaired user is provided. A map is displayed on a display module of a device and a grid is overlaid onto the displayed map using a rendering module. Each cell of the grill corresponds to a location on the map. Further, a user selection is received using the input module concerning a cell of the grid from the displayed map. Information associated with a selected cell is retrieved using the location module within the device and a speech segment relating to the information is output using an output module.

20 Claims, 8 Drawing Sheets

METHOD AND SYSTEM FOR PROVIDING MAP INTERACTIVITY FOR A VISUALLY-IMPAIRED USER

FIELD OF THE INVENTION

Embodiments of the present disclosure relate generally, to computer-generated maps, and more specifically, to map interactivity for visually-impaired users.

BACKGROUND

Over the years, various applications have been developed to assist visually-impaired users to use hand-held devices. One such application, iPhone OS's VoiceOver accessibility feature, allows interaction with objects on screen and hear description of the objects. The VoiceOver accessibility feature provides audio descriptions of items on the screen, including status information such as battery level, Wi-Fi and cellular network signal levels, the cellular network provider, time of day as well as make calls. Although the maps support the VoiceOver accessibility feature, the screen reader only provides description when the map has moved or the current zoom level on the map upon zoom. However, this information does not assist, for example, a blind person to search, explore or access other functionalities of the map. Thus, a vast potential of map functionalities remain unutilized by the visually-impaired users.

Based on the foregoing, there is a need for a method and system for providing map interactivity for a visually-impaired user and to overcome the abovementioned shortcoming in the disclosed field.

SUMMARY

An example of a method for providing map interactivity for a visually-impaired user includes displaying of a map on a device. The method also includes overlaying a grid onto the displayed map, each cell of the grill corresponding to a location on the map. Further, the method includes receiving a user selection concerning a cell of the grid from the displayed map and retrieving information associated with a selected cell. Further, the method also includes outputting a speech segment relating to the information.

An example of a computer program product for use with a computer. The computer program product comprising a non-transitory computer-readable medium that when executed by a processor, performs a method for providing map interactivity for a visually-impaired user. The method also includes displaying of a map on a device, overlaying a grid onto the displayed map, each cell of the grill corresponding to a location on the map, receiving a user selection concerning a cell of the grid from the displayed map, retrieving information associated with a the selected cell and outputting a speech segment relating to the information.

An example of a device to provide map interactivity for a visually-impaired user includes a display module to output a map. The device also includes a rendering module to overlay a grid onto the displayed map, each cell of the grill corresponding to a location on the map. Further, the device includes an input module to receive a user selection concerning a cell of the grid from the displayed map, a location module to retrieve information associated with a selected cell and an output module to generate a speech segment relating to the information.

The features described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

Figure 1:
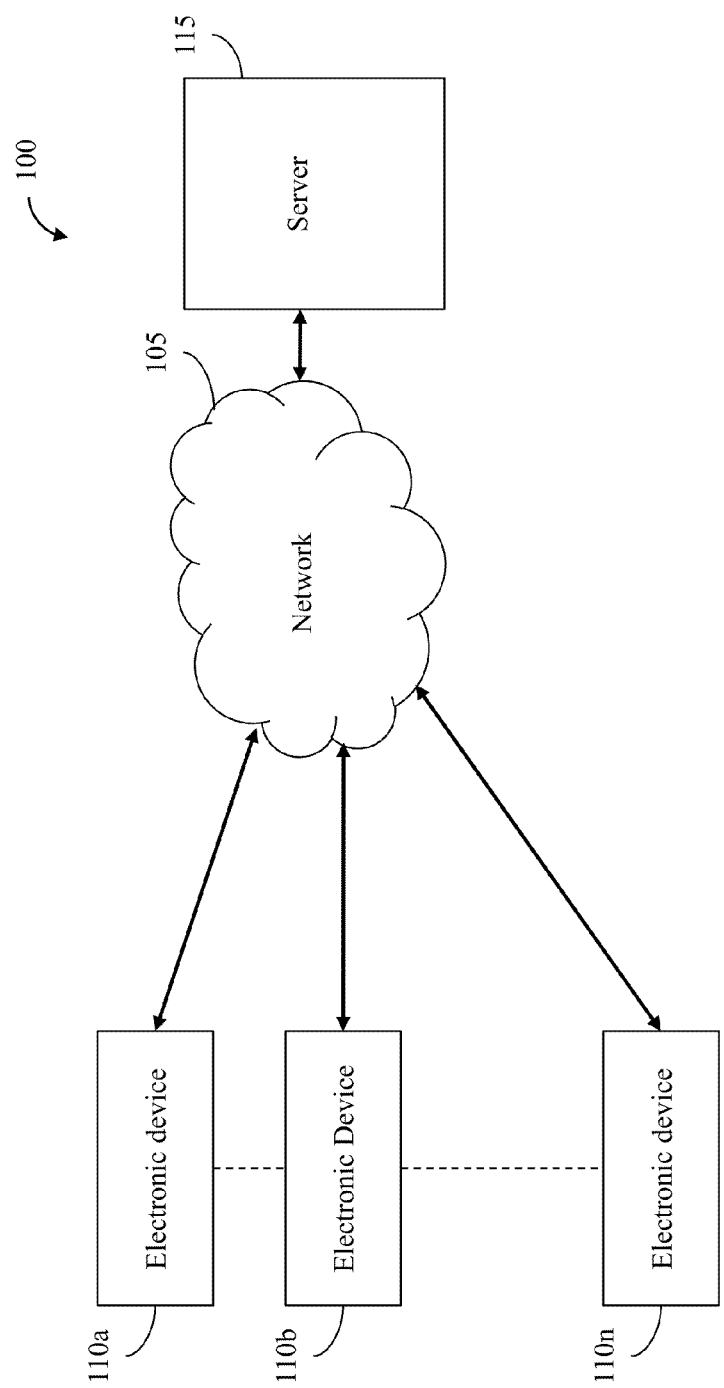
FIG. 1 illustrates a block diagram of an environment, in accordance with which various embodiments can be implemented.

The embodiments have been represented where appropriate by conventional symbols in the drawings, showing only those specific details that are pertinent for understanding the embodiments of the present invention so as not to obscure the disclosure with details that will be readily apparent to those of ordinary skill in the art having the benefit of the description herein.

DETAILED DESCRIPTION OF THE EMBODIMENTS

The present disclosure describes a method, system and computer program product for providing map interactivity for a visually-impaired user. The following detailed description is intended to provide example implementations to one of ordinary skill in the art, and is not intended to limit the invention to the explicit disclosure, as one or ordinary skill in the art will understand that variations can be substituted that are within the scope of the invention as described.

FIG. 1 illustrates a block diagram of an environment 100, in accordance with various embodiments. The environment 100 includes a network 105, one or more electronic devices, for example an electronic device 110a, and electronic device 110b . . . to an electronic device 110n (hereinafter collectively referred to as "device 110"). The device 110 is connected to a server 115 through the network 105. The server 115 can also be a web server.

Examples of the electronic devices include, but are not limited to, computers, mobile devices, laptops, palmtops, internet protocol televisions (IPTVs) and personal digital assistants (PDAs). Examples of the network 105 include, but are not limited to, a Local Area Network (LAN), a Wireless Local Area Network (WLAN), a Wide Area Network (WAN), wired network, wireless network, internet and a Small Area Network (SAN).

The device 110 may be communicably coupled to the server 115 through the network 105. The server 115 may provide users of the device 110 access to a map and related information.

In an embodiment, the device 110 provides means of interaction that allows a visually-impaired user to explore, discover, maps, geographical features and location. In the device 110, the maps are visual interactive representation of a 3-dimensional (3D) space depicting either geographical locations or custom information. Further, data associated with the maps is represented using hierarchical form (e.g., country level, state level, city level, and street level). Examples of the data associated with the maps can include, but are not limited to, map data, location information, GPS location, and direction information.

In one embodiment, a map is displayed on display screen of the device 110. The map and data associated with the map can be sourced from the server 115. A grid is overlaid onto the displayed map, each cell of the grill corresponding to a location on the map. Each cell is an accessible element that allows for a label and hint value. In one embodiment, the number of rows and column of accessible elements in the grid is determined to allow a smooth granularity in displaying information. When the visually-impaired user swipes to or moves finger over or single taps the accessible element, a screen reader in the device 110 speaks out the label and after a delay, the hint value. For example, the label can refer to "United States" and hint value as "North America" when a user action is noted over the accessible element displaying the United States on a World Map. In addition, multiple layers can be associated with the map and each layer can correspond to the displayed maps at different zoom or panning levels. Different layers can be accessed by means of one or more user action on the display screen. Generally, the multiple layers correspond to a form of hierarchical data. Further, local listings in a user-defined location and directions can also be extracted from the displayed map by means of user actions using the device 110.

The device 110 can include one or more hardware elements. The device 110 including hardware elements are explained in detail in conjunction with FIG. 2.

Figure 2:
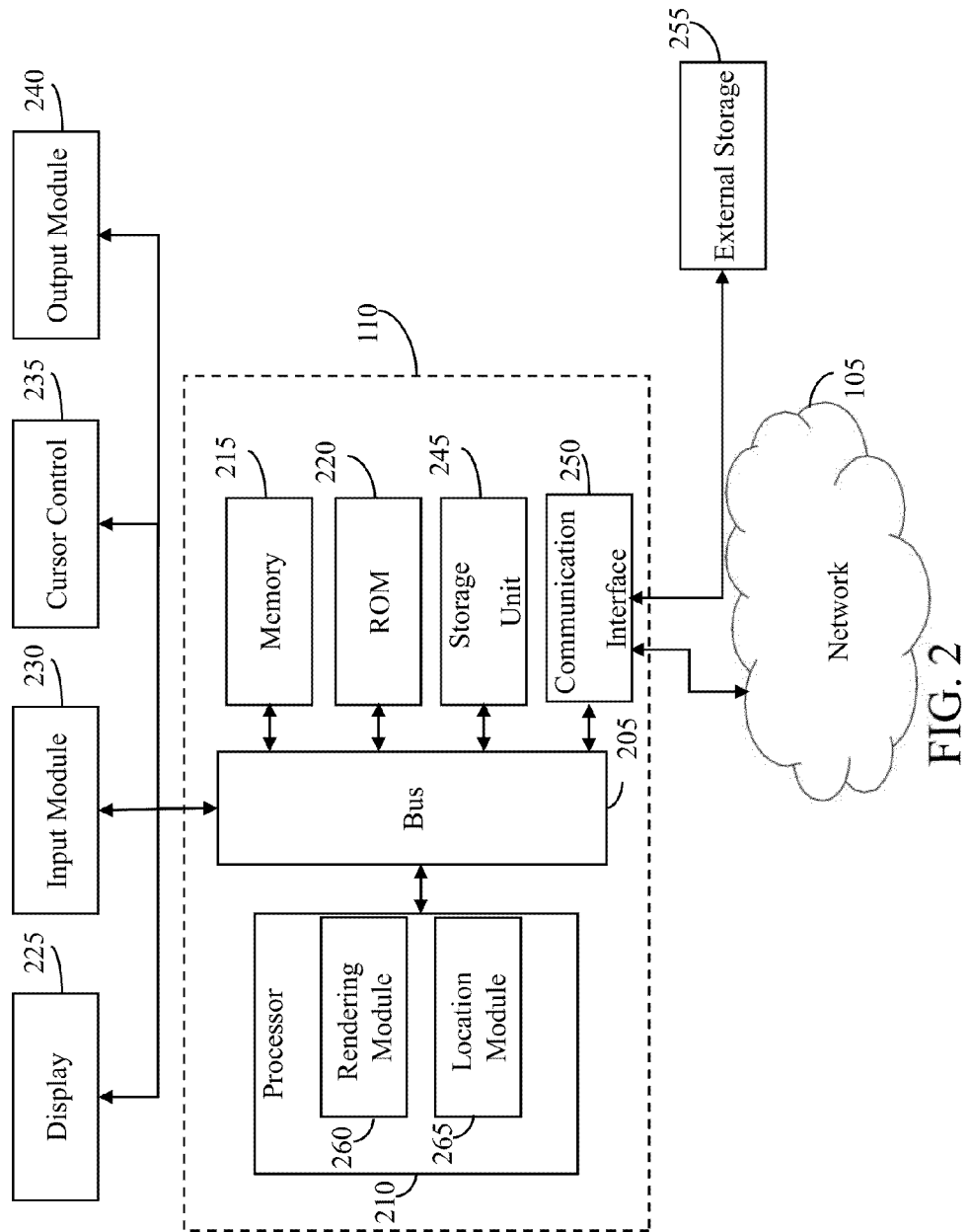
FIG. 2 illustrates a block diagram of a device, in accordance with an embodiment.

FIG. 2 illustrates a block diagram of the device 110, in accordance with one embodiment. The device 110 includes a bus 205 for communicating information, and a processor 210 coupled with the bus 205 for processing information. The device 110 also includes a memory 215, for example a random access memory (RAM) coupled to the bus 205 for storing instructions to be executed by the processor 210. The memory 215 can be used for storing temporary information required by the processor 210. The device 110 further includes a read only memory (ROM) 220 or other static storage unit coupled to the bus 205 for storing static information and instructions for processor 210. A storage unit 245, such as a magnetic disk or hard disk, can be provided and coupled to the bus 205 for storing information.

The device 110 can be coupled via the bus 205 to a display 225, for example a cathode ray tube (CRT) or liquid crystal display (LCD), for displaying information. An input device 230, including various keys, is coupled to the bus 205 for communicating information and command selections to the processor 210. In some embodiments, cursor control 235, for example a mouse, a trackball, a joystick, or cursor direction keys, for command selections to the processor 210 and for controlling cursor movement on the display 225 can also be present. The functioning of the input device 230 can also be performed using the display 225, for example a touch screen. In some embodiments, the display 225 may perform the functions of the input device 230. For example, consider a touch screen display operable to receive haptic input. An output module 240 is also coupled to the device 110 that is operable to output a speech segment in response to a processing function.

Various embodiments are related to the use of the device 110 for implementing the techniques described herein. The techniques can be performed by the device 110 in response to the processor 210 executing instructions included in the memory 215. The instructions can be read into the memory 215 from another machine-readable medium, such as the storage unit 245. Execution of the instructions included in the memory 215 causes the processor 210 to perform the techniques described herein.

The term machine-readable medium can be defined as a medium providing data to a machine to enable the machine to perform a specific function. The machine-readable medium can be a storage media. Storage media can include non-volatile media and volatile media. The memory 215 can be a volatile media. All such media must be tangible to enable the instructions carried by the media to be detected by a physical mechanism that reads the instructions into the machine.

Examples of the machine readable medium includes, but are not limited to, a non-transitory medium, a floppy disk, a flexible disk, hard disk, magnetic tape, a CD-ROM, optical disk, punchcards, papertape, a RAM, a PROM, EPROM, and a FLASH-EPROM.

In some embodiments, the machine-readable medium can be transmission media including coaxial cables, copper wire and fiber optics, including the wires that include the bus 205. Transmission media can also take the form of acoustic or light waves, such as those generated during radio-wave and infra-red data communications. Examples of machine-readable medium may include but are not limited to carrier waves as describer hereinafter or any other media from which the device 110 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the device 110 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 245 either before or after execution by the processor 210. All such media must be tangible to enable the instructions carried by the media to be detected by a physical mechanism that reads the instructions into a machine.

The device 110 also includes a communication interface 250 coupled to the bus 205 for enabling data communication. Examples of the communication interface 250 include, but are not limited to, an integrated services digital network (ISDN) card, a modem, a local area network (LAN) card, an infrared port, a Bluetooth port, a zigbee port, and a wireless port.

The device 110 can be coupled to an external storage 255 that stores the database of the set of records. In some embodiments, the database can be stored in the storage unit 245 of the device 110.

In an embodiment, a map is displayed on the display 225 of the device 110. The map can be displayed in response to a user input on the device 110. The processor 210 (or other graphics processor or hardware) overlays a grid onto the displayed map, each cell of the grill corresponding to a location on the map. The processor is operable to receive a user selection on the display 225 (e.g., a touch screen) concerning a cell of the grid from the displayed map. Further, the processor 210 retrieves information associated with a selected cell and outputs a speech segment relating to the information using the output module 240. The processor 210 can execute instructions for text to speech functionality to convert text information to voice signal. The device 110 can include additional modules not shown are possible, such as a text-to-speech module, a GPS module, and the like.

In some embodiments, the processor 210 can include one or more processing units for performing one or more functions of the processor 210 such as rendering module 260 to overlay the grid onto the displayed map and a location module 265 to retrieve the information associated with the selected cell. The processing units are hardware circuitry performing specified functions. In general, the processing units and modules can include hardware, software instructions, or a combination of both.

In some embodiments, the device 110 can run an application from a cloud-based service provider such as Yahoo! Maps or MapQuest. The grid can be overlaid locally by the device 110 (e.g. using a plug-in, a client or a $3^{rd}$ party application, or the grid can be overlaid remotely by the service provider. The voice segments can be stored locally (temporarily in a cache, or long term on a hard drive) or remotely as well.

An operating system (OS) can be specially customized for assisting visually-impaired users. For example, a mobile telephone OS can be enabled to activate native functionalities. An API between the OS and a map application can be used to access the native functions which are necessary for interacting with the grid. In some embodiments, the map application adds functionality.

It may be appreciated by any person skilled in the art that the above description of various functional modules may include main embodiments of the present inventions. Further, there may be other embodiments and functional modules that may be suitable for the subject matter and may be implemented in light of the description present in this disclosure. Also, various modules of the device 110 may be understood more clearly when read in conjunction with the method of FIG. 3.

Figure 3:
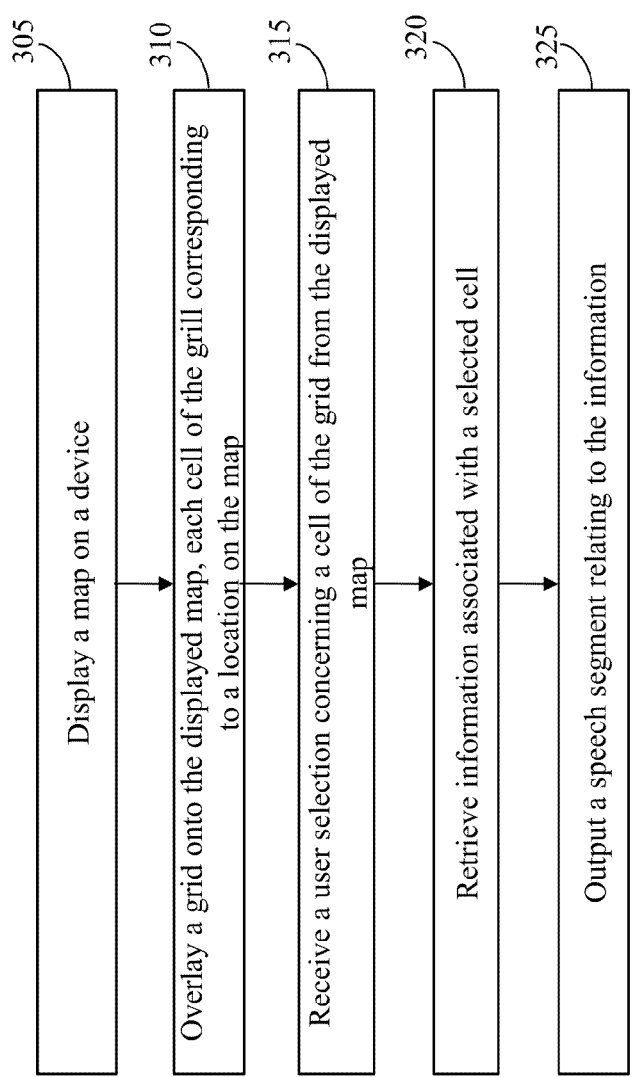
FIG. 3 is a flowchart illustrating a method for providing map interactivity for a visually-impaired user, in accordance with an embodiment.

FIG. 3 is a flow-chart illustrating a method for providing map interactivity for a visually-impaired user. In an embodiment, the map interactivity can be enabled by initializing a mode in the device 110 to assist visually-impaired users.

At step 305, the map is displayed on a device. The map is a visual element in user devices such as touch-screen mobile devices and presents hierarchical data. The maps can be sourced from a network server such as the server 115 or stored locally in the storage unit 245.

In one embodiment, a first layer of the map is displayed. The first layer can correspond to map data at a first zoom level. Optionally, a different layer or zoom level can be configured.

At step 310, a grid is overlaid onto the displayed map. Each cell of the grill corresponding to a location on the map. Each cell is an accessible element that allows for a label and hint value. The number of rows and column of accessible elements in the grid is determined to allow a smooth granularity in displaying information. For example, row or column size of each cell in the grid can be limited to 40×40 pixels. In some embodiments, the grid is composed of equally sized squares or rectangles. In other embodiments, the grid can include natural lines that follow, for example, a river or highway that does not run a straight course.

At step 315, a user selection is received concerning a cell of the grid from the displayed map.

The actions to select the cell of the grid are configurable and can include, but are not limited to, swiping to, moving finger over, single tapping or double tapping on the displayed map. In an embodiment, the user selection is transferred with a single point, multi-point contact, or gesture swipe to a touch screen. Alternatively, voice commands or visual cues can transfer user input.

At step 320, information associated with a selected cell is retrieved. The center coordinate of the selected cell is mapped onto the map coordinate. The information for the map coordinate can be then retrieved from the storage unit 245. The information associated with map coordinates are accessed from the server 115 when the maps are sourced and stored in the storage unit 245.

In some embodiments, the information associated with the map can be retrieved in substantially real-time from the server 115. The information can be sent over a variety of communications channels such as a data network or a cellular network.

The information can include location on the map associated with the selected cell or facts associated with the location on the map associated with the selected cell. For example, a voice segment can be output to read the name of a city or closest street associated with the cell. In another example, a point of interest customized to a particular user can be output.

The label and hint values are populated when the information is retrieved from the storage unit 245. The label and hint value changes in relation to the layers of the map or zoom-levels associated with the map.

In one example, the label and hint values are associated as follows:

Mode: Location
Scale: Global Label: Country Hint: Continent
Scale: Country Label: Region Hint: Country
Scale: Region Label: State Hint: Region
Scale: State Label: City Hint: State
Scale: City Label: Neighborhood Hint: City
Scale: Neighborhood Label: Street Hint: Neighborhood
Scale: Street Label: Address Hint: Street Example 1

Mode: Location

Scale: Global Label: United States Hint: North America
Scale: Country Label: West Coast Hint: United States
Scale: Region Label: California Hint: West Coast
Scale: State Label: Sunnyvale Hint: California
Scale: City Label: Sunnyvale Hint: Sunnyvale
Scale: Neighborhood Label: North Mathilda Hint: Sunnyvale
Scale: Street Label: 701 First Ave Hint: North Mathilda In another example, the label and hint values are associated as follows:
Mode: Geographic
Scale: Global Label: Country Hint: Continent/Ocean/Sea/Land
Scale: Country Label: Region Hint: Country in Continent
Scale: Region Label: Feature Type Hint: State in Region
Scale: State Label: Feature Name Hint: Feature Type in State
Scale: City Label: Feature Details Hint: Feature details in City Example 2

Mode: Geographic

Scale: Global Label: United States Hint: Land Mass in North America
Scale: Country Label: West Coast Hint: United States in North America Scale: Region Label: Mountains Hint: California in West Coast Scale: State Label: Sierra Nevada Hint: Mountains in California Scale: City Label: Yosemite National Park Hint: Sierra Nevada in California Once the information is received, the user can be notified using an alert signal.

At step 325, a speech segment relating to the information is output. The speech segment format includes the label and the hint value.

In one embodiment, the visually-impaired user (or any user) swipes to or moves finger over or single taps the accessible elements on the device 110, a screen reader in the device 110 speaks out the label and after a delay, the hint value. For example, the label can refer to "United States" and hint value as "North America" when a user action is noted over the accessible element displaying the United States on a World Map.

In a second embodiment, the visually-impaired user can use further user-actions on the device 110 to zoom-in or pan-out the displayed map. The user-actions are configurable. For example, the visually-impaired user can touch the accessible element or the selected cell with one finger and tap the display of the device 110 to zoom into the location associated with the selected cell of the first layer of the map to reach a second layer. The first and second layers can each include one of a continent layer, a country layer, a state layer, a county layer, a city layer, a neighborhood layer, a street layer, and a street address layer. Similarly, the visually-impaired user can zoom-in or reach further layers of the map. Further, the visually-impaired user can touch the accessible element or the selected cell with one finger and double tap the display of the device 110 to zoom out of the location associated with the selected cell from the second layer to the first layer.

In some embodiments, if no data is associated with the selected cell, the label and hint values are set to empty and can be notified to the user as no information being available.

In yet another embodiment, the visually-impaired user can access local listing in and around a desired location. The visually-impaired user can double-tap and hold the cell associated with the desired location for a user-defined duration. As the visually-impaired user continues to hold their finger on the screen after double tap, a search distance is spoken to the user. The distance is incremented to a predefined radius after a 1.5 second time interval, till a potentially maximum radial distance is reached. When the visually-impaired user releases their hold on the screen or when the maximum radial distance is matched, the search is performed for local listing. The search is executed using Yahoo! Local. The selected cell's center map coordinate is used as center and the last radius spoken as radius for search.

In some embodiments, the method for providing map interactivity can be extended to applications for visually-impaired users. For example, as an educational tool, the method can be extended to allow a user to move their fingers to explore an object, and then tap to drill into a certain part and drill in further till you reach the bottom most level. The double-tap navigation can be used to drill back up to the top level. An example for label and hint values for different levels is illustrated below

Example 3

Mode: Education Tool

Level: 0 Label: Human Body Hint: Explore/Discover human body

Level: 1 Label: Chest Hint: Human Body

Level: 2 Label: Rib cage Hint: Chest

Level: 3 Label: Heart Hint: Rib Cage

In some embodiments, the method for providing map-interactivity can also be extended to discovering or browsing content on web pages.

Exemplary illustrations of map interactivity for visually-impaired users are further described using FIGS. 4A through 4E.

Figure 4A:
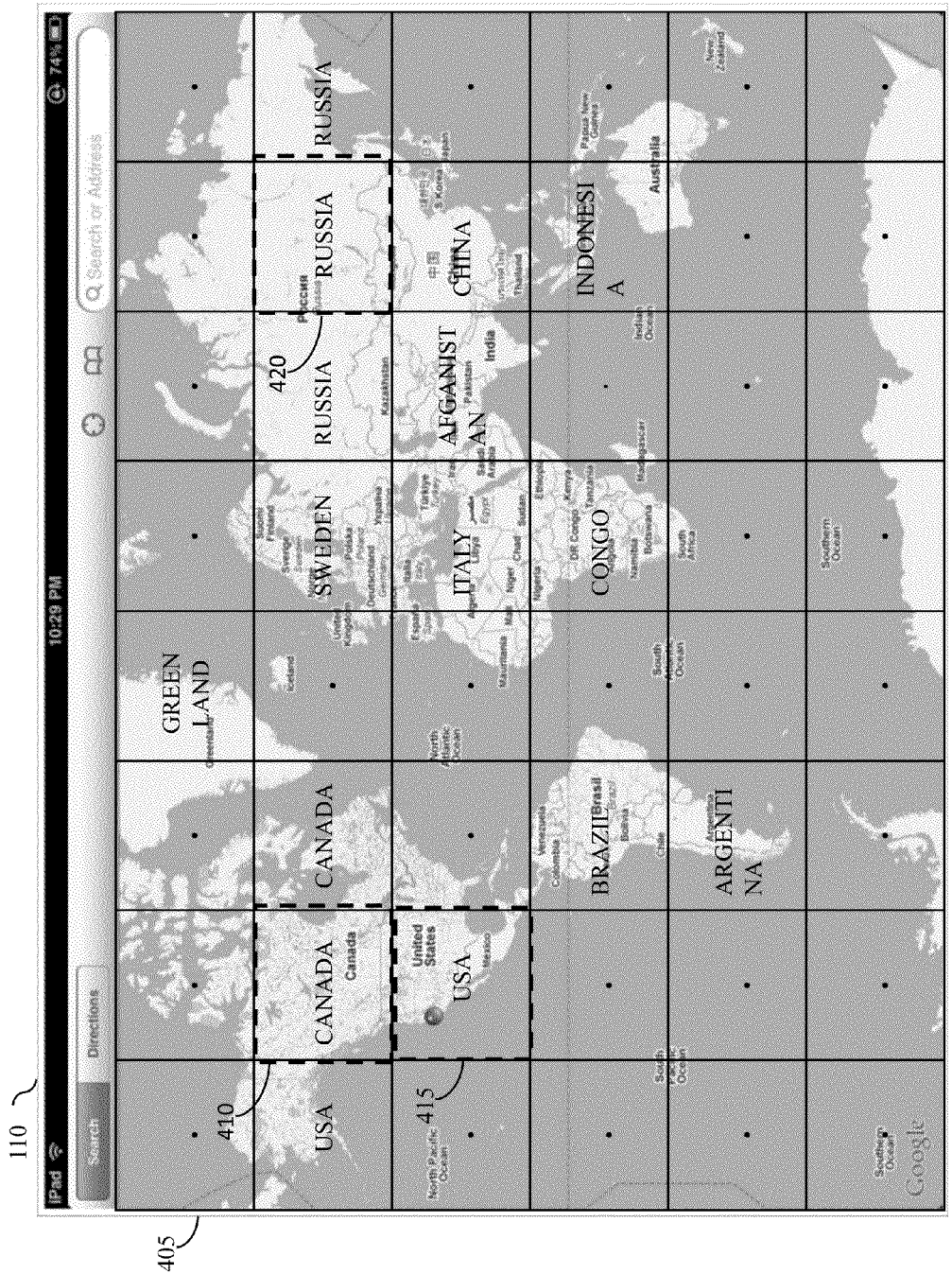
FIGS. 4A-4E are exemplary illustrations of map interactivity performed by a visually-impaired user.

As in FIG. 4A, a first layer of the map is displayed on the device 110. At the first layer, the map displays the world map. A grid 405 is overlaid on the map and each cell of the grid 405 is associated with an accessible element. The center coordinate of each cell is converted into map coordinate in latitude and longitude, and a label and hint value is associated with the each cell. For example, a cell 410 is associated with the country "Canada" and is loaded with label "Canada" and hint value "North America". A cell 415 is associated with the country "United States" and is loaded with label "United States" and hint value "North America". A cell 420 is associated with the country "Russia" and is loaded with label "Russia" and hint value "Asia". Similarly, all cells are associated with their respective label and hint values.

Figure 4B:
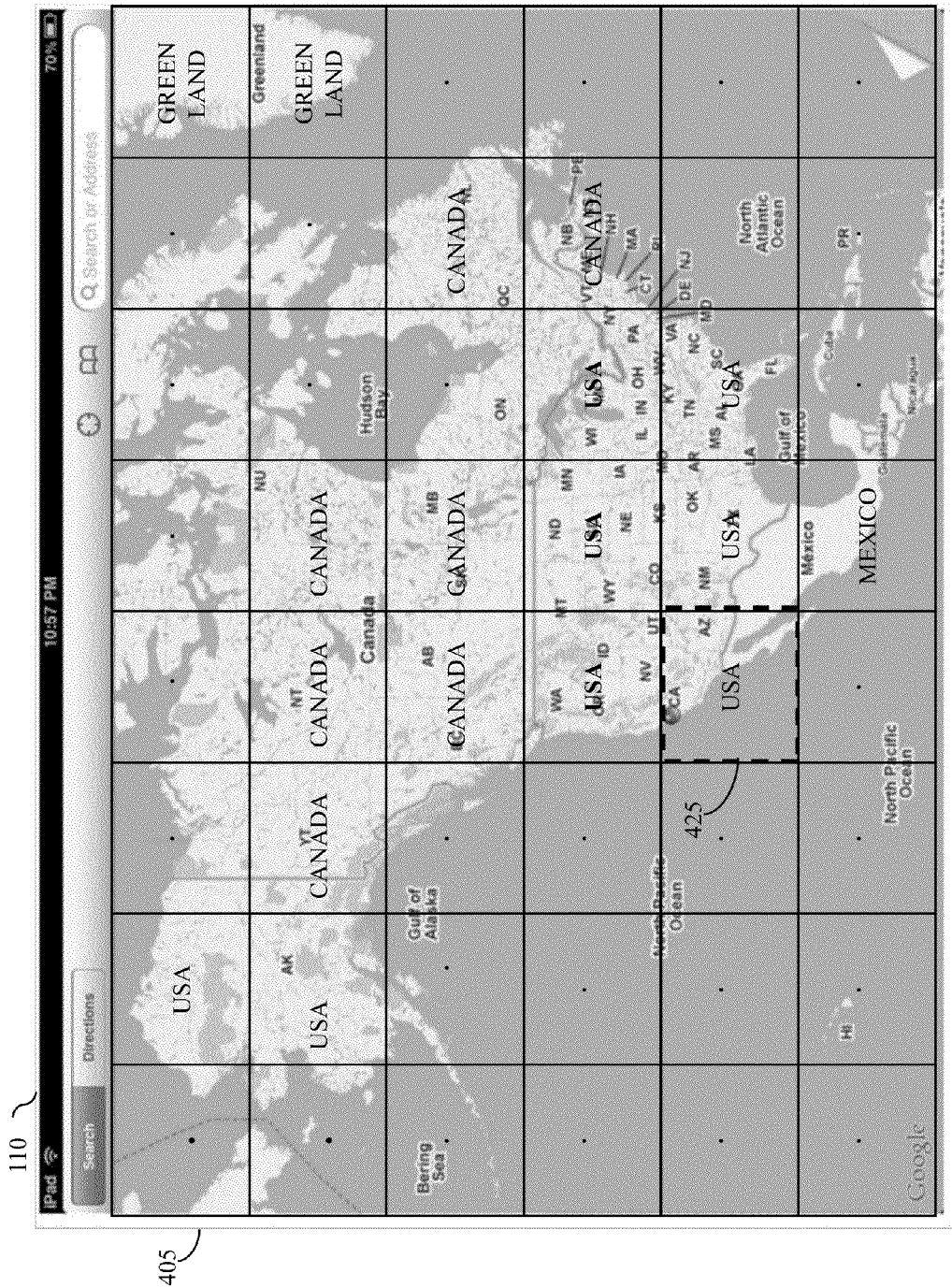

Once the entire label and the hint values are loaded, the visually-impaired user is notified using an alert signal. The visually-impaired user can swipe the cells to hear the label and hint-values associated with the cells. Further, the visually-impaired user touches the cell 415 and double-taps into the display screen of the device 110 to zoom-in to reach a second layer of the map as shown in FIG. 4B. The cells of the grid 405 are again loaded with label and hint values for the second layer. For example, a cell 425 is associated with the label "West Coast" and hint value "United States".

Figure 4C:
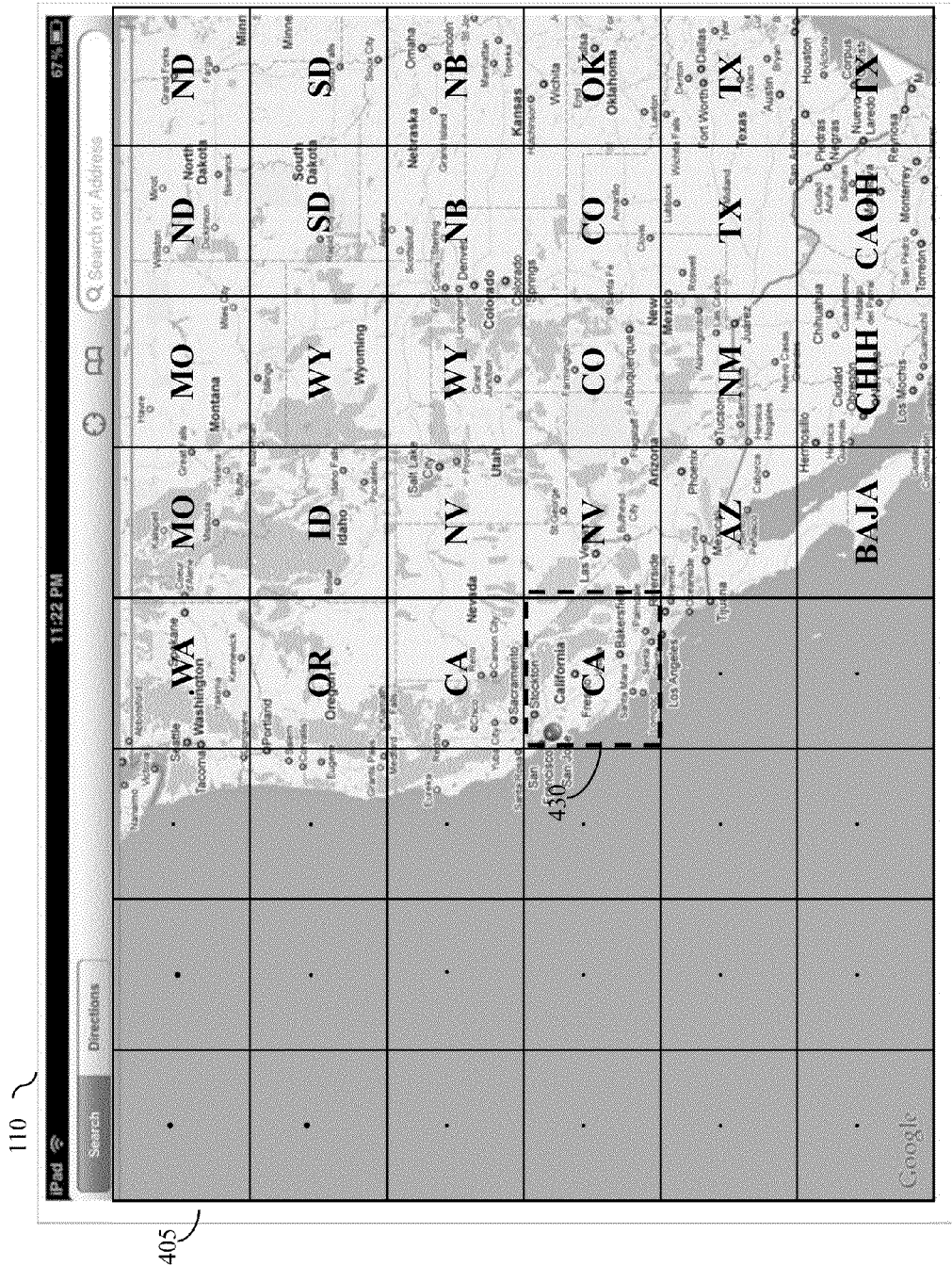

The visually-impaired user touches the cell 425 and double-taps into the display screen of the device 110 to zoom-in to reach a third layer as in FIG. 4C. The cells of the grid 405 are again loaded with label and hint values for the third layer. For example, a cell 430 is associated with the label "California" (CA) and hint value "West Coast".

Figure 4D:
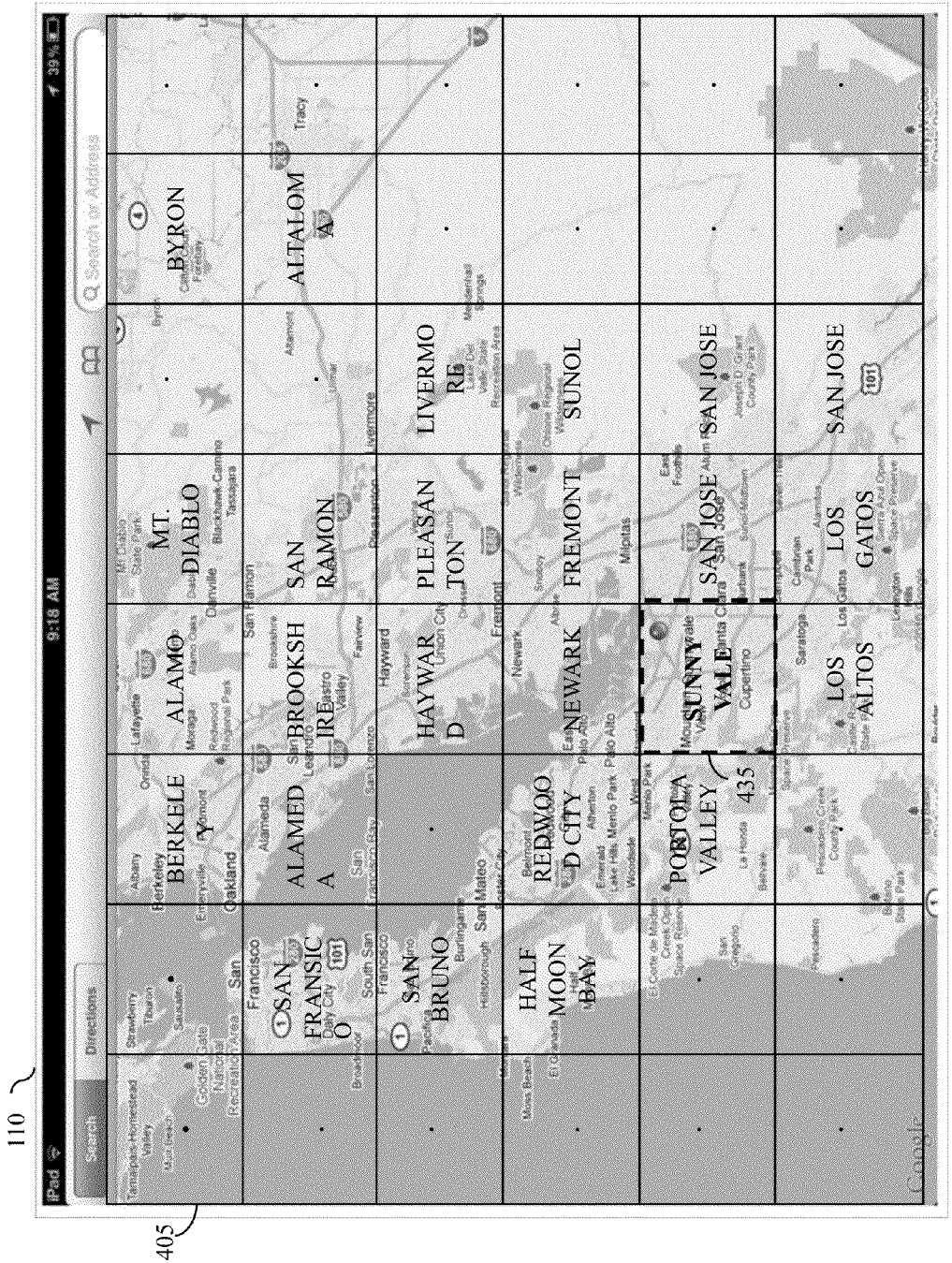

Further, the visually-impaired user touches the cell 430 and double-taps into the display screen of the device 110 to zoom-in to reach a fourth layer as in FIG. 4D. The cells of the grid 405 are again loaded with label and hint values for the fourth layer. For example, a cell 435 is associated with the label "Sunnyvale" and hint value "California" (CA).

Figure 4E:
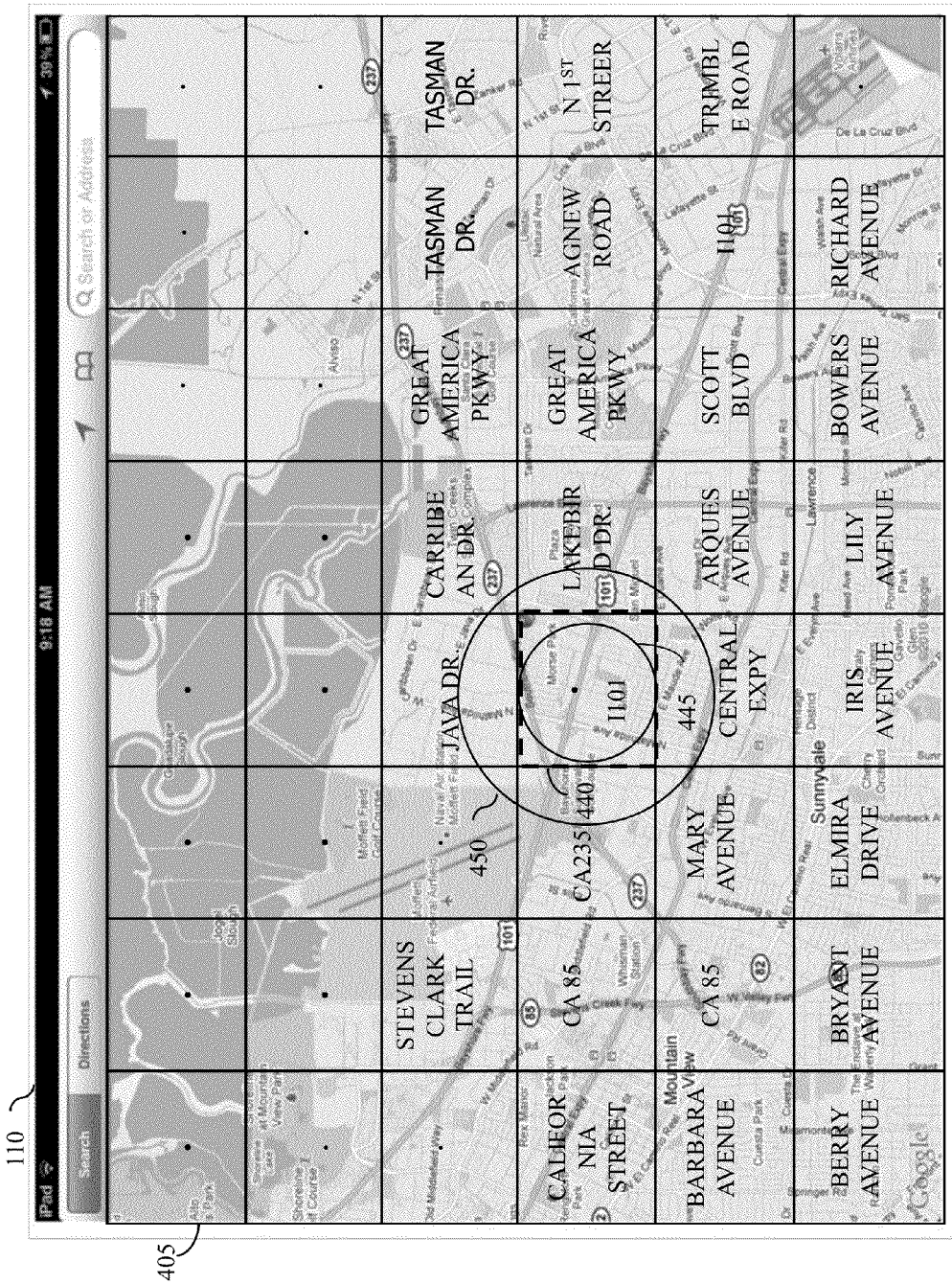

Furthermore, the visually-impaired user touches the cell 435 and double-taps into the display screen of the device 110 to zoom-in to reach a fifth layer as in FIG. 4E. The cells of the grid 405 are again loaded with label and hint values for the fifth layer. For example, a cell 440 is associated with the label "I 101" and hint value "SUNNYVALE".

The visually-impaired user can then double-tap and hold the cell 440 to perform a search for local listing in the vicinity of "I101". As the visually-impaired user continues to hold their finger on the screen after double tap, a search distance is spoken to the user. The distance is incremented to a predefined radius after a 1.5 second time interval (shown using 445), till a user desired radial distance (shown using 450) is reached. When the visually-impaired user releases their hold on the screen, the search is performed for local listing.

The present disclosure allows visually impaired users to explore, discover, interact with and search the map. The invention enables the user to explore their surroundings and perform searches related to the chosen location. In addition, the present disclosure allows extending the method of map-interactivity to other applications including, but not limited to discovering content on web pages.

The present disclosure may also be embodied in a computer program product for providing map interactivity for visually-impaired users. The computer program product may include a non-transitory computer usable medium having a set program instructions comprising a program code for displaying of a map on a device, overlaying a grid onto the displayed map, receiving a user selection concerning a cell of the grid from the displayed map, retrieving information associated with a the selected cell and outputting a speech segment relating to the information. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

The foregoing description sets forth numerous specific details to convey a thorough understanding of embodiments of the invention. However, it will be apparent to one skilled in the art that embodiments of the invention may be practiced without these specific details. Some well-known features are not described in detail in order to avoid obscuring the invention. Other variations and embodiments are possible in light of above teachings, and it is thus intended that the scope of invention not be limited by this Detailed Description, but only by the following Claims.

What is claimed is:

1. A method comprising:
    displaying, by a processor, a map on a device;
    overlaying, by the processor, a grid onto the displayed map, each cell of the grid corresponding to a region having contained therewith a location on the map, wherein boundaries between adjacent cells are based on one of (i) a geometric array, and (ii) natural lines which follow geographical features of regions;
    receiving, by the processor, a user selection concerning a cell of the grid from the displayed map, wherein the user selection is received from a user and concerns any point within the region of the cell;
    retrieving, by the processor, information associated with the selected cell; and
    outputting, by the processor, a speech segment relating to the information, wherein the speech segment relating to the information which is output includes (i) a label and, following a delay, (ii) a hint, both of which change in relation to the layers of the map or zoom-levels associated with the map, the hint comprising a broader representation of the information compared with the label; and
    notifying, by the processor, the user via an alert signal when the hint and label are loaded.

2. The method of claim 1, further comprising:
    initializing a mode in the device to assist visually-impaired users.

3. The method of claim 1, wherein displaying the map comprises:
    displaying the map on a touch screen display device.

4. The method of claim 1, wherein displaying the map comprises:
    displaying a first layer of the map; and
    responsive to a user selection, displaying a second layer of the map having greater detail than the first layer.

5. The method of claim 4, wherein the first and second layers each comprise one of a city layer, a neighborhood layer, and a street address layer.

6. The method of claim 1, further comprising:
    determining a current location of the device;
    centering the map on the cell representing the region containing the current location; and
    responsive to a change in the current location, updating the map centering.

7. The method of claim 1, wherein the information comprises a location contained with the region on the map associated with the cell.

8. The method of claim 1, wherein the information comprises a fact concerning a location contained within the region on the map associated with the cell.

9. A non-transitory computer-readable storage medium that when executed by a processor, performs a method comprising:
    displaying, by the processor, a map on a device;
    overlaying, by the processor, a grid onto the displayed map, each cell of the grid corresponding to a region having contained therewithin a location on the map, wherein boundaries between adjacent cells are based on one of (i) a geometric array, and (ii) natural lines which follow geographical features of regions;
    receiving, by the processor, a user selection concerning a cell of the grid from the displayed map, wherein the user selection is received from a user and concerns any point within the region of the cell;
    retrieving, by the processor, information associated with the selected cell; and
    outputting, by the processor, a speech segment relating to the information, wherein the speech segment relating to the information which is output includes (i) a label, and, following a delay, (ii) a hint, both of which change in relation to the layers of the map or zoom-levels associated with the map, the hint comprising a broader representation of the information compared with the label; and
    notifying, by the processor, the user via an alert signal when the hint and label are loaded.

10. The non-transitory computer readable storage medium of claim 9, further comprising:
    initializing a mode in the device to assist visually-impaired users.

11. The non-transitory computer readable storage medium of claim 9, wherein displaying the map comprises:
    displaying the map on a touch screen display device.

12. The non-transitory computer readable storage medium of claim 9, wherein displaying the map comprises:
    displaying a first layer of the map;
    responsive to a user selection, displaying a second layer of the map having greater detail than the first layer.

13. The non-transitory computer readable storage medium of claim 12, wherein the first and second layers each comprise one of a city layer, a neighborhood layer, and a street address layer.

14. The non-transitory computer readable storage medium of claim 9, further comprising:
    determining a current location of the device;
    centering the map on the cell representing the region containing the current location; and responsive to a change in the current location, updating the map centering.

15. The non-transitory computer readable storage medium of claim 9, wherein the information comprises a location contained within the region on the map associated with the cell.

16. The non-transitory computer readable storage medium of claim 9, wherein the information comprises a fact concerning a location contained within the region on the map associated with the cell.

17. A device comprising:
a processor;
a storage medium for tangibly storing thereon program logic for execution by the processor, the program logic comprising:
a display module executed by the processor to output a map;
a rendering module executed by the processor to overlay a grid onto the displayed map, each cell of the grid corresponding to a region having contained therewithin a location on the map, wherein boundaries between adjacent cells are based on one of (i) a geometric array, and (ii) natural lines which follow geographical features of regions;
an input module executed by the processor to receive a user selection concerning a cell of the grid from the displayed map, wherein the user selection is received from a user and concerns any point within the region of the cell;
a location module executed by the processor to retrieve information associated with the selected cell; and
an output module executed by the processor to generate a speech segment relating to the information, the speech segment relating to the information which is output includes (i) a label, and, following a delay, (ii) a hint, both of which change in relation to the layers of the map or zoom-levels associated with the map, the hint comprising a broader representation of the information compared with the label; and
a notifying module executed by the processor to notify the user via an alert signal when the hint and label are loaded.

18. The device of claim 17, wherein the display module comprises a touch screen display module.

19. The device of claim 17, wherein the display module outputs a first layer of the map, and responsive to a user selection, the display module outputs a second layer of the map having greater detail than the first layer.

20. The device of claim 19, wherein the first and second layers each comprise one of a city layer, a neighborhood layer, and a street address layer.

* * * * *